(12) United States Patent
Regalado

(10) Patent No.: US 6,810,652 B1
(45) Date of Patent: Nov. 2, 2004

(54) APPARATUS ATTACHABLE TO A LAWN MOWER FOR COLLECTING LAWN TRIMMINGS USING A DISPOSABLE COLLECTION BAG

(76) Inventor: Richard T. Regalado, 12695 Utica Cir., Broomfield, CO (US) 80020

( * ) Notice: Subject to any disclaimer, the term of this patent is extended or adjusted under 35 U.S.C. 154(b) by 0 days.

(21) Appl. No.: 10/762,614

(22) Filed: Jan. 22, 2004

(51) Int. Cl.⁷ .............................................. A01D 67/00
(52) U.S. Cl. ....................................... 56/320.2; 56/202
(58) Field of Search ............................... 56/320.2, 202, 56/203, 199, 200, 194, 16.6

(56) References Cited

U.S. PATENT DOCUMENTS

| | | |
|---|---|---|
| 3,722,192 A | 3/1973 | Corbett |
| 3,822,536 A | 7/1974 | Leader |
| 3,890,772 A | 6/1975 | Seifert et al. |
| 4,059,398 A | 11/1977 | Zimmer et al. |
| 4,149,363 A * | 4/1979 | Woelffer et al. ............... 56/202 |
| 4,186,546 A | 2/1980 | Machado et al. |
| 4,233,806 A | 11/1980 | Richardson |
| 4,310,990 A | 1/1982 | Payne |
| 4,345,418 A | 8/1982 | Arizpe |
| 4,413,467 A | 11/1983 | Arizpe |
| 4,505,095 A | 3/1985 | Short, Sr. |
| 4,566,257 A | 1/1986 | Akrabawi |
| 4,631,909 A | 12/1986 | McLane |
| 4,693,064 A * | 9/1987 | Katayama ..................... 56/202 |
| 4,848,070 A | 7/1989 | Berglund |
| 5,042,241 A * | 8/1991 | Boylston et al. ............... 56/202 |
| 5,243,809 A | 9/1993 | Redding |
| 5,564,265 A * | 10/1996 | Pitt .............................. 56/202 |
| 6,151,875 A * | 11/2000 | Collins ......................... 56/202 |

* cited by examiner

Primary Examiner—Árpád Fábián Kovács
(74) Attorney, Agent, or Firm—Lathrop & Gage L.C.

(57) ABSTRACT

The present invention relates to an apparatus removably attachable to a rotary lawn mower for collecting grass, leaves, and debris in a disposable collection bag, such as a plastic garbage bag.

10 Claims, 4 Drawing Sheets

APPARATUS ATTACHABLE TO A LAWN MOWER FOR COLLECTING LAWN TRIMMINGS USING A DISPOSABLE COLLECTION BAG

FIELD OF INVENTION

The present invention is generally directed to an apparatus removably attachable to a rotary lawn mower for collecting grass, leaves, and debris in a disposable collection bag.

BACKGROUND OF INVENTION

There are several devices that have been developed over the years for mounting on lawn mowers to catch grass, leaves, and debris. One type of device that is widely used is a flexible bag made of a material that is pervious to air, and which is connected to the grass discharge chute on the rotary lawn mower. A disadvantage of this type of collection system is that the operator must remove the bag and dump the contents collected in the bag into a trash can or garbage bag and then replace the bag on the mower. The present invention allows the grass, leaves, and debris to be collected directly into a garbage bag and thus there is no need to transfer the materials from the collection bag to another container.

There also have been grass-catching devices for lawn mowers using disposable bags. For example, there is the device described in U.S. Pat. No. 4,345,418, which claims a specially designed lawn mower on which a discharge chute may be mounted for collecting grass in a disposable bag. The present invention is designed for use on existing consumer and commercial lawn mowers and does not require a specially designed lawn mower.

U.S. Pat. No. 4,233,806 also describes a collection device using an impermeable collection bag. That device is not self-contained and does not have a bag support and exhaust vent as claimed in the present invention. Instead, in the '806 Patent the collection bag is supported by the handle of the lawn mower. In addition, the device in the '806 Patent uses a perforated screen to trap grass and debris in the collection bag.

U.S. Pat. No. 4,848,070 also describes and claims a grass catching apparatus for a mower that supports the collection bag on the handles of the mower rather than using a separate support system as claimed in the present invention. The device in the '070 Patent also recirculates the exhaust air back into the grass cutting chamber of the lawn mower.

Other U.S. Patents that illustrate the general state of the art for collection bags for lawn mowers include: U.S. Pat. Nos. 5,243,809; 4,631,909; 4,566,257; 4,505,095; 4,413,467; 4,310,990; 4,186,546; 4,059,398; 3,890,772; and 3,722,192.

SUMMARY OF INVENTION

The present invention relates to an apparatus removably attachable to a rotary lawn mower for collecting grass, leaves, and debris in a disposable collection bag, such as a plastic garbage bag.

An object of this invention is to provide a self-contained apparatus for collecting grass in a disposable garbage bag, which apparatus can be easily mounted on and removed from a consumer or commercial lawn mower.

A further object of the invention is to provide a means for easily connecting the apparatus to and removing it from the grass discharge chute of a rotary lawn mower.

A further object of the invention is for the apparatus to support the disposable collection bag as it collects grass and debris and to prevent the bottom of the collection bag from floating upward.

A further object of the invention is to provide a method for easily attaching and detaching the disposable collection bag to the apparatus.

A further object of the invention is to provide a means for venting air out of the collection bag and for preventing grass, leaves, and debris from being vented out of the collection bag.

A further object of the invention is to make the bag support movable so as to allow the collection bag to be easily removed from the apparatus when the bag is full.

A further object of the invention is to prevent rocks, sticks and other rigid objects that may be discharged from the lawn mower from perforating the collection bag.

A further object of the invention is to redirect the air flow from the exhaust vent away from the lawn mower.

BRIEF DESCRIPTION OF DRAWINGS

The invention will be clearly understood by those skilled in the art by reference to the accompanying drawings, wherein the invention is depicted in an illustrative manner:

FIG. 4 shows the disposable bag attached to the apparatus. FIGS. 5, 6, and 7 show three consecutive stages of removal of the disposable bag from the apparatus after the bag is full.

DETAILED DESCRIPTION OF THE PREFERRED EMBODIMENT

Figure 1:
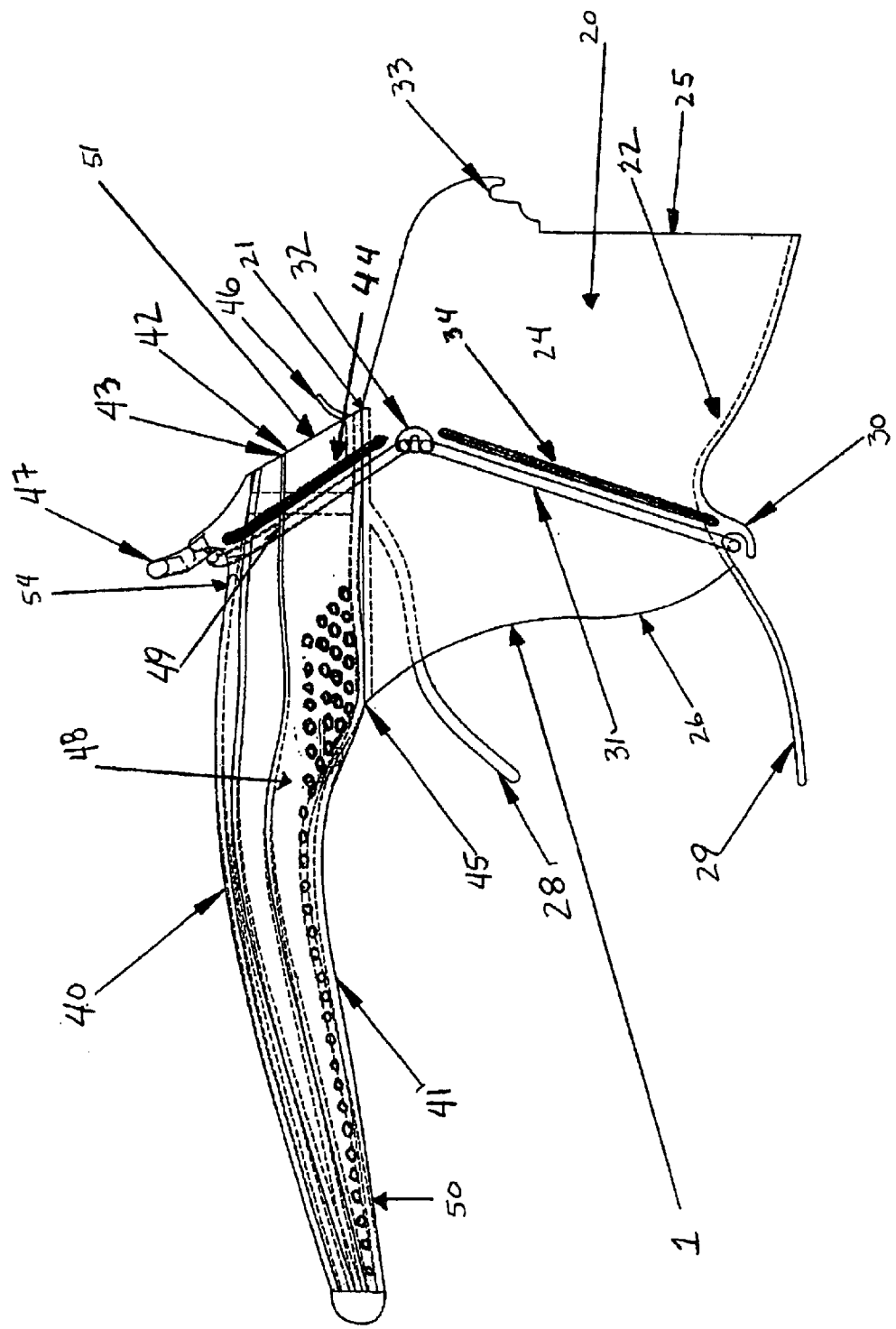
FIG. 1 is a side view of the apparatus that is attachable to a lawn mower for use in collecting lawn trimmings using a disposable bag.
Figure 2:
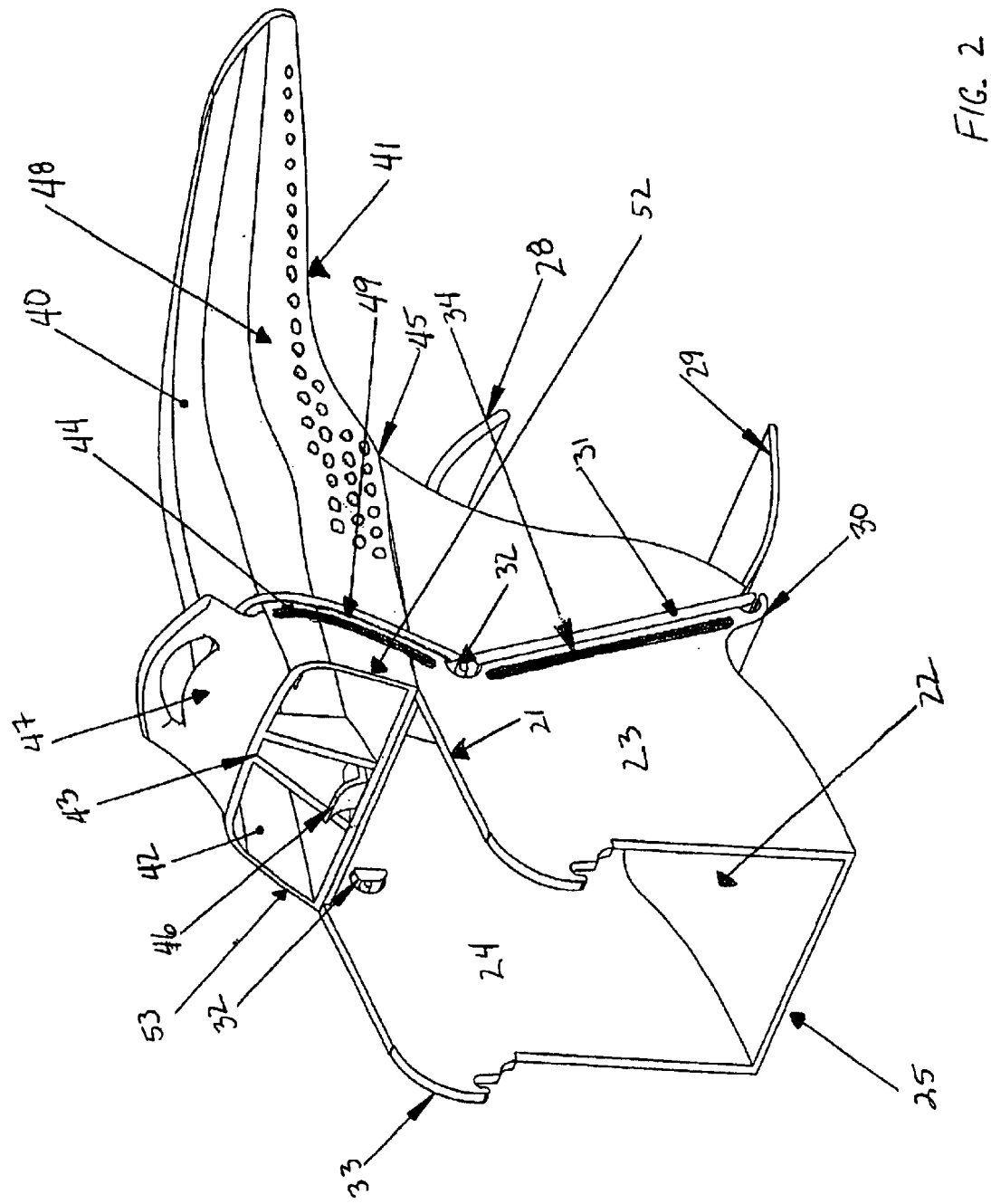
FIG. 2 is a perspective view of the apparatus that is attachable to a lawn mower for use in collecting lawn trimmings using a disposable bag.
Figure 3:
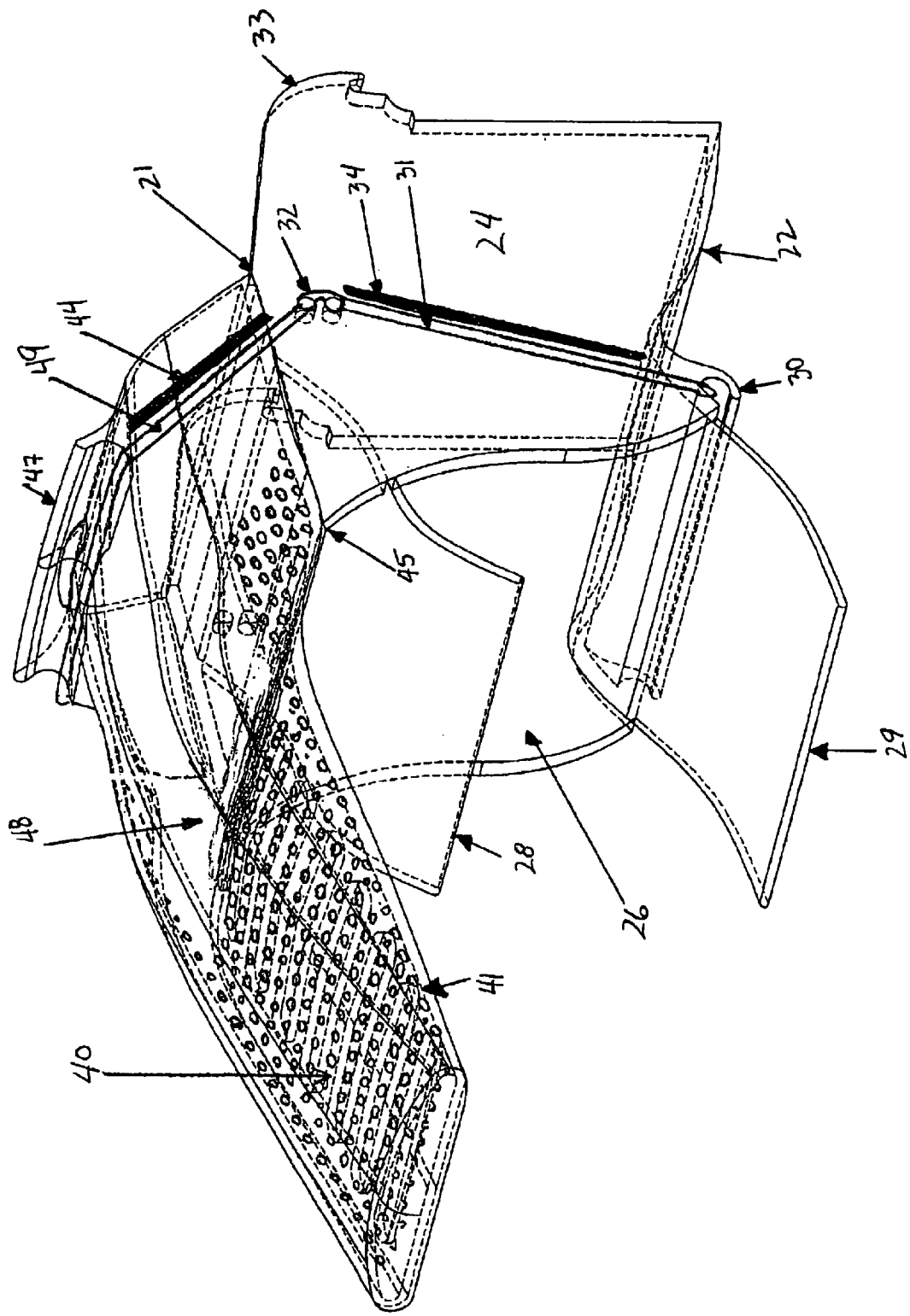
FIG. 3 is a rear view of the apparatus that is attachable to a lawn mower for use in collecting lawn trimmings using a disposable bag.

As shown in FIGS. 1 and 2, the apparatus 1 comprises a housing 20 and a bag support and exhaust vent 40 that is movably attached to a top 21 of the housing 20.

The housing 20 comprises the top 21, a bottom 22, a left side 23 (shown in FIG. 2), a right side 24, a front opening 25, and a rear opening 26. The housing further provides a plurality of rigid mounting hooks 33 that allow the apparatus 1 to be easily mounted to the grass discharge chute of a common consumer or commercial rotary lawn mower.

When the apparatus is attached to a rotary lawn mower and the lawn mower is in operation, air, grass, leaves, and debris will flow from the grass discharge chute of the lawn mower into the front opening 25 of the housing 20 through the rear opening 26 of the housing 20 and into the collection bag 5 (shown in FIGS. 4–7).

The apparatus 1 shown in FIGS. 1 through 7 is designed to attach to a rotary lawn mower with a rear grass discharge chute. The apparatus 1 may also be configured to attach to a rotary lawn mower with a side grass discharge chute.

The mounting hooks 33 may take different forms depending on the design and/or model of the lawn mower to which the apparatus is attached.

In its preferred embodiment, the bottom 22 of the housing 20 curvingly ramps upward from the front opening 25 of the housing 20. The ramping upward of the bottom 22 of the housing 20 forces air, grass and other materials to flow from the lawn mower in an upward direction into the collection bag 5 so as to prevent clogging and congestion of materials at the front opening 25 of the housing 20.

Rigidly attached to the inside of top 21 of the housing 20 and extending rearward and downward in a curving manner is an upper shield 28. The upper shield 28 serves two distinct purposes. First, it reduces and redirects the flow of air generated by the rotary lawn mower causing the grass clippings to flow into the collection bag 5. The upper shield 28 also protects the disposable collection bag 5 from sticks, stones and other rigid objects that may perforate the bag 5.

Rigidly attached to the bottom 22 of the housing 20 and extending rearward is a lower shield 29. The lower shield 29 also serves two separate purposes. First, it prevents the collection bag 5 from floating upward when the lawn mower is being operated. The lower shield 29 also serves to protect the collection bag 5 from being punctured by stones, sticks, and other rigid objects.

Rigidly attached at the bottom 22 of the housing 20 is a lower hook 30. In addition, a lower elastic cord 31 is removably attached to the housing 20 through eyelets 32 on the left side 23 and right side 24 of the housing 20. The lower elastic cord 31 extends down the left side 23 and the right side 24 of the housing 20 along lower elastic cord ridges 34 on the left side 23 and right side 24 of the housing 20, which keep the lower elastic cord 31 in place and serve to secure further the collection bag 5 during operations of the lawn mower. The lower elastic cord 31 also extends under the bottom 22 of the housing 20.

The apparatus further comprises a bag support and exhaust vent 40 that is movably attached at the top 21 of the housing 20. The bag support and exhaust vent 40 comprises a hollow chamber 48 that extends rearward from the top 21 of the housing 20 and provides support for the collection bag 5. The bottom 50 of the bag support and exhaust vent 40 contains a plurality of openings 41 that allow air generated from the rotary lawn mower to flow into the hollow chamber 48 of the bag support and exhaust vent 40 and out a vent opening 42 at the front 51 of the bag support and exhaust vent 40. The preferred embodiment for the openings 41 are circular holes less than ½ inch in diameter. Such openings 41 reduce the flow of grass clippings and other materials into the hollow chamber 48 and out of the bag support and exhaust vent 40. As an alternative to circular holes, slots or other small openings may be used at the bottom 50 of the bag support and exhaust vent 40. Near the vent opening 42 is a redirection means 43 for redirecting the exhaust air flow from the bag support and exhaust vent 40. In FIG. 2, this means for redirecting the airflow 43 comprises two rigid members that are angled one to the left side 52 (shown in FIG. 2) of the bag support and exhaust vent 40 and one to the right side 53 (shown in FIG. 2) of the bag support and exhaust vent 40. The purpose of redirecting the air flow from the vent opening 42 is to direct air flow to the sides of the lawn mower so as to avoid having air and small particles pass directly over the lawn mower.

Figure 5:
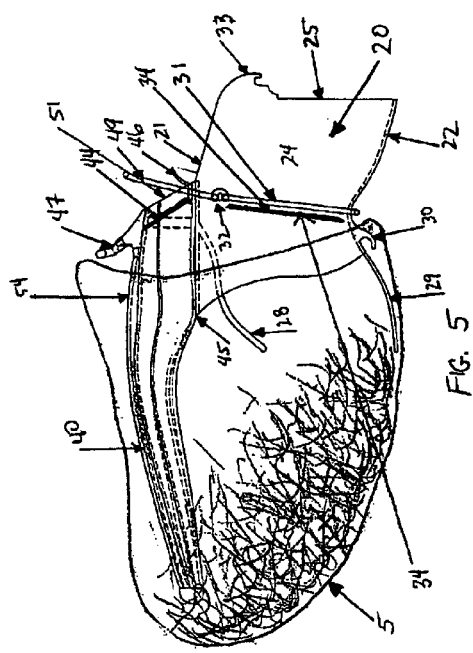
FIGS. 4, 5, 6 and 7 are side views of the apparatus that is attachable to a lawn mower for use in collecting lawn trimmings using a disposable bag.
Figure 7:
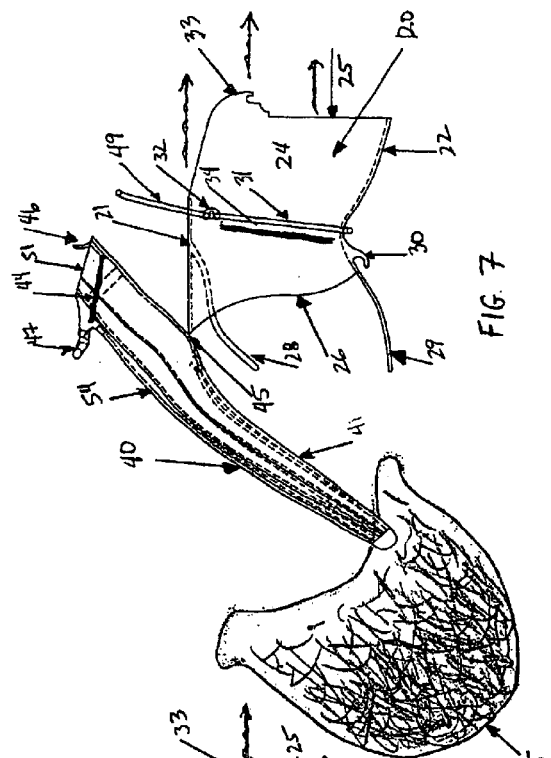
Figure 6:
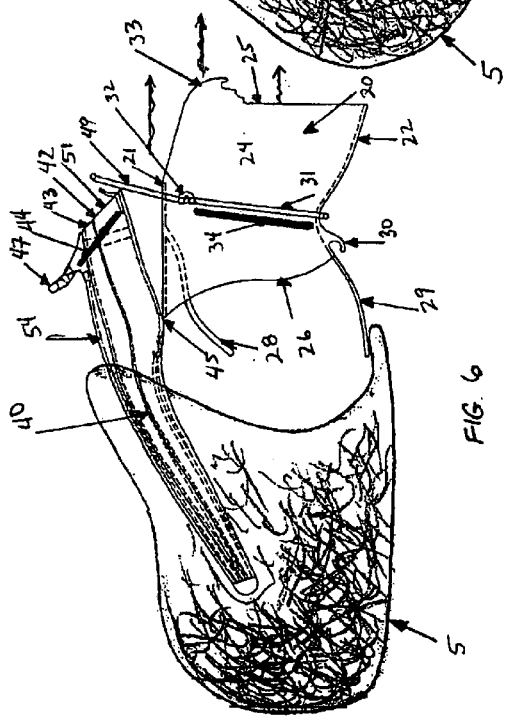

As shown in FIGS. 5, 6, and 7, the bag support and exhaust vent 40 is attached to the housing 20 by a hinge 45 or other means known by persons skilled in the art that allows the rear portion of the bag support and exhaust vent 40 to be lowered for ease of removing a full collection bag 5. The bag support and exhaust vent 40 locks into place at the top of the housing by a latch 46 or other locking means known to persons skilled in the art. Adjacent the top 54 and front 51 of the bag support and exhaust vent 40 is an upper hook 47 over which the collection bag 5 is placed to help secure the bag 5 while the lawn mower is in operation. The hook 47 may also serve as a handle for carrying the apparatus 1. An upper elastic cord 49 is removably attached through eyelets 32 on the left side 23 (shown in FIG. 2) and right side 24 of the housing 20 and near the top 21 of the housing 20. The upper elastic cord 49 is used to keep the collection bag 5 in place during operation of the lawn mower and to further secure the bag support and exhaust vent 40 in a locked position. Upper elastic cord ridges 44 are located on the left side and the right side of the bag support and exhaust vent 40 and extend downward and frontward from the upper hook 47 to the top 21 of the housing 20. When the bag support and exhaust vent 40 is in a locked position (see FIG. 4), the upper elastic cord 49 is placed over the front 51 extending to the top 54 of the bag support and exhaust vent 40, to the rear of the upper hook 47 and to the rear of the upper elastic cord ridges 44.

Figure 4:
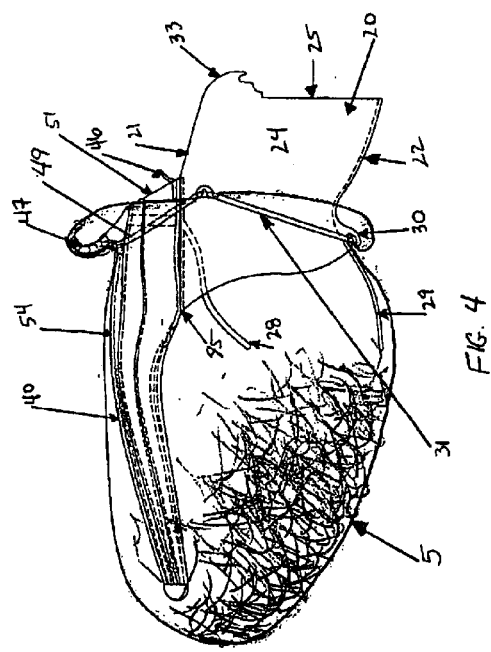

When using the apparatus 1 to collect grass, leaves, and debris, the apparatus is removably attached to the lawn mower at the grass discharge chute by using the mounting hooks 33. The bag support and exhaust vent 40 is placed in a locked position. As shown in FIG. 4, the disposable collection bag 5 is placed over the bag support and exhaust vent 40 and over the lower shield 29. The leading edge of the collection bag 5 is placed over the upper hook 47, the lower hook 30, over the lower elastic cord ridges 34, and over the upper elastic cord ridges 44. The upper elastic cord 49 is extended and placed over the upper leading edge of the bag 5, over and to the rear of the upper hook 47, and to the rear of the upper elastic cord ridges 44. The lower elastic cord 31 is extended and placed over the lower leading edge of the bag 5, over an to the rear of the lower hook 30, and to the rear of the lower elastic cord ridges 34. The lawn mower is then started and operated for purposes of cutting and collecting grass, collecting leaves, or collecting other debris. When the collection bag is full, the lawn mower is turned off and, as shown in FIGS. 5, 6, and 7, the collection bag is removed by extending the upper elastic cord 49 and placing it in front of the upper hook 47 and the upper elastic cord ridges 44. The lower elastic cord 31 is extended and placed in front of the lower hook 30 and the lower elastic cord ridges 34. The latch 46 is disengaged and the rear portion of the bag support and exhaust vent 40 is lowered toward the ground to allow the collection bag 5 to be easily removed.

In its preferred embodiment, the housing 20 and the bag support and exhaust vent 40 are made of a light-weight plastic or polymer. Other materials may be used, including wood, metal, and fiberglass.

It is therefore to be understood that while preferred forms and methods of the invention have been herein set forth and described, various modifications and changes may be made in the construction and arrangement of parts, composition of materials, and order of steps without departing from the scope of the present invention.

I claim:

1. An apparatus removably attachable to a rotary lawn mower for collecting grass, leaves, and other debris in a disposable collection bag, comprising:

a housing with a top, bottom, left side, right side, an open front side and an open rear side that will allow air, grass, leaves and other materials to flow through the housing from front to rear;

a means for attaching the housing to a rotary lawn mower at a grass discharge chute of the rotary lawn mower;

an upper shield rigidly attached to the top of the housing and extending rearward and downward from the top of the housing;

a lower shield rigidly attached to the bottom of the housing and extending rearward from the bottom of the housing;

a bag support and exhaust vent that is movably attached to the top of the housing whereby the bag support and exhaust vent comprises:

a top, a bottom, a front, and a rear;

a rigid hollow chamber that extends rearward from the front of the bag support and exhaust vent;

a means for movably attaching the bottom of the bag support and exhaust vent to the top of the housing so that the rear of the bag support and exhaust vent may be lowered toward the ground for ease in removing the disposable collection bag once the disposable collection bag is filled;

a means for locking the bag support and exhaust vent to the top of the housing;

a vent opening at the front of the bag support and exhaust vent;

a means for redirecting air flow from the vent opening away from the rotary lawn mower;

a plurality of small openings on the bottom of the bag support and exhaust vent that allow air to flow from the housing into the hollow chamber in the bag support and exhaust vent and out the vent opening;

a means for attaching the disposable collection bag over the rear of the bag support and exhaust vent, over the rear opening of the housing, and over the lower shield and upper shield of the housing.

2. The invention set forth in claim 1, wherein the means for attaching the housing to the rotary lawn mower comprise a plurality of mounting hooks.

3. The invention set forth in claim 1, wherein the means for attaching the disposable collection bag comprises:

an upper hook that is rigidly attached to the top of the bag support and exhaust vent;

a lower hook that is rigidly attached to the bottom of the housing;

an upper elastic cord that is removably attached at the left side and the right side of the housing, said elastic cord extendable over the top of the housing and the front and top of the bag support and exhaust vent;

a lower elastic cord removably attached to the left side and right side of the housing and extendable down the left side and the right side of the housing and under the bottom of the housing;

a plurality of lower elastic cord ridges that extend along the left side and the right side of the housing; and a plurality of upper elastic cord ridges that extend along the left side and the right side of the bag support and exhaust vent.

4. The invention set forth in claim 1, wherein the bottom of the housing is curvingly ramped upward from the front opening of the housing toward the rear opening of the housing.

5. The invention as set forth in claim 3, wherein the upper hook also serves as a handle for carrying the apparatus.

6. The invention as set forth in claim 1, wherein the means for movably attaching the bag support and exhaust vent to the top of the housing is a hinge attached to bottom of the bag support and exhaust vent and the top of the housing.

7. The invention as set forth in claim 1, wherein the means for locking the bag support and exhaust vent to the top of the housing is a latch bottom and front of the bag support and exhaust vent.

8. The invention as set forth in claim 1, wherein the means for redirecting air flow from the vent opening away from the rotary lawn mower comprise two rigid members located at the vent opening where one of the rigid members is angled to the left side of the bag support and exhaust vent and the other rigid member is angled to the right side of the bag support and exhaust vent.

9. The invention as set forth in claim 1, wherein the bag support and exhaust vent and the housing are constructed from a plastic composite material.

10. The invention as set forth in claim 1, wherein the lower shield serves to prevent the collection bag from floating upward during operation of the rotary lawn mower.

* * * * *